N. Blake.
Earth Auger.
Nº 8,882. Patented Apr. 20, 1852.
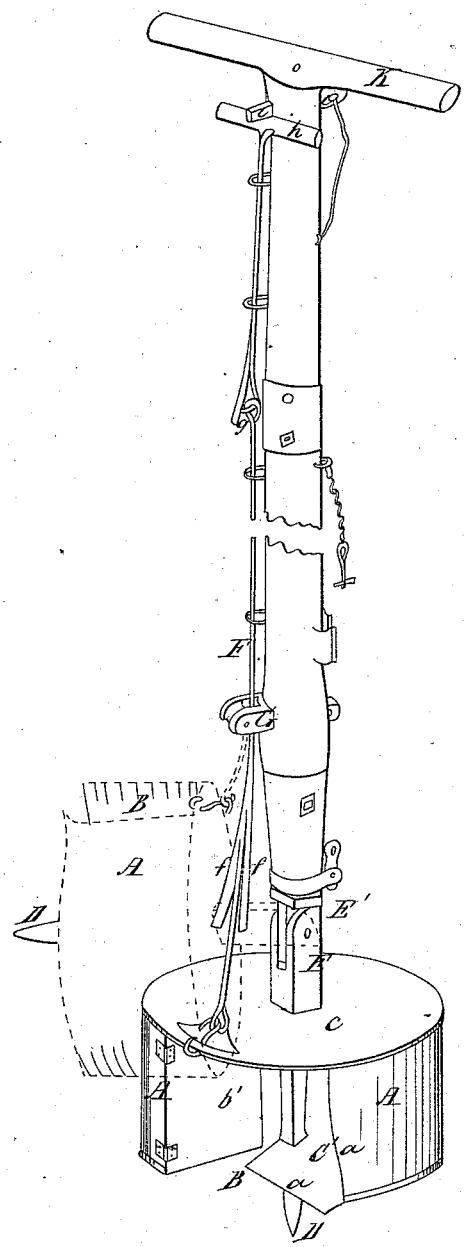

UNITED STATES PATENT OFFICE.

NORMAN BLAKE, OF IRA, NEW YORK.

SUBMARINE AUGER.

Specification of Letters Patent No. 8,882, dated April 20, 1852.

*To all whom it may concern:*

Be it known that I, NORMAN BLAKE, of Ira, in the county of Cayuga and State of New York, have made a new and useful Improvement in Augers for Boring Under Water, called a "Submarine Auger;" and I do hereby declare that the following is a full, clear, and exact description of the same, reference being had to the annexed drawings, making a part of this specification.

The nature of my invention consists in forming an auger with a snail shaped pod, having a lip on the bottom and side thereof, and in providing the shaft to which the pod is attached with a half hinged joint, by which the mouth of the auger may be raised to a horizontal position through the agency of connecting wires, being retained in that position by a spring catch, until the auger and its contents are brought to the surface, and the mineral wealth brought to light, or a survey of the characteristics of the bottom of rivers irrespective of the depth of water; when intended to operate on a large scale not being liable to the objections of an auger invented by I. Buck of losing all the contents, if a storm or other substance should prevent the mouth of the pod closing, as from such a difficulty in the above instrument in drawing it up, the water passing through it would wash the gold out and disappointment result; this difficulty my invention overcomes as the change of position constitutes it a bucket. When used on a large scale a suitable cable is fastened to the socket of the first upright, and snapped into clasps on the sides of those uprights; the lengths of the joints or uprights may be varied to suit any depth of water.

To enable others skilled in the art to make and use my invention, I will proceed to describe its construction and operation.

A A is a representation of the pod of the auger the return $b'$ may be stationary (or hinged and secured by a bolt entering the shaft E.)

$a\ a$ are lips or cutters, B the mouth or opening; $c$, the top of the auger forming a circle, but the bottom $c'$ is slightly elliptical and has a portion removed thus forming the mouth and lip $a$, which is turned downward to enter the earth.

D a short shifting point used when the mud is firm, if soft a long one used and if rocky bottom the point dispensed with, the lower side $C'$ being slightly eccentric the lip $a$ projects and cuts a larger circle in the mud than the pod and thus permits it to change its position when acted on by the connecting wires; E a short square upright united and passing through the pod, on its upper end a half or shoulder hinge joint $E'$ is formed, which is united to the lower end, or socket of the first joint this hinge $E'$ permits the change of position when required; F the connecting wires, attached by a hook to the top of the pod near its periphery and resting on C, and having two spring catches $f, f$, which close as the wire passes through a slot in a stub G placed on the first joint of the auger stem. The upper end of each wire has an eye $g$, into which the next wire is secured by a hook and spring catch, the last wire required has a bar $h$, inserted in the eye, upon which a wedged shaped bolt $i$ is forced, thus locking the connecting wires to the stem, while the pod is turned by the handle K on the stem or shaft; for the convenience of operating at different depths under water, I make two or more lengths of the upper joint of the stem, each having a handle and wire, all the lower joints also supplied with telegraph wires working through staples, and the joints of the stem secured with bolts and spring keys. For the convenience of removing the contents of large machines, the return piece $b'$ may be hinged and a stop bolt or rod inserted in the shaft passing through the pod.

The mode of operating the auger is simple: from a suitable position either on a raft or boat the auger is lowered in the water until joint on the first length of shaft reaches the surface thereof; then successive lengths are applied and secured, until the bottom is reached, observing to finish the length required with a joint provided with a handle and bolt; then turn the auger and its pod fills against the return piece $b'$, when by removing the bolt $i$ and drawing the connecting wires F the pod is made to change position as indicated in dotted lines, and retained, with the mouth horizontal, by the spring catches $f\ f$ passing through the slot in G; it is then raised, unshipping the stem and wires until the pod is brought up.

Having thus described my invention, what I claim and desire to secure by Letters Patent is—

Forming a pod auger with a hinge joint E' in combination with connecting wires, substantially in the manner and for the purposes set forth and shown.

In testimony whereof I have hereunto signed my name before two subscribing witnesses.

NORMAN BLAKE.

Witnesses:
 JOHN F. CLARK,
 JOHN L. SMITH.